June 8, 1926.  1,588,159
J. F. BOLGIANO
ADJUSTABLE IDLER STRUCTURE
Filed Sept. 21, 1923  2 Sheets-Sheet 2
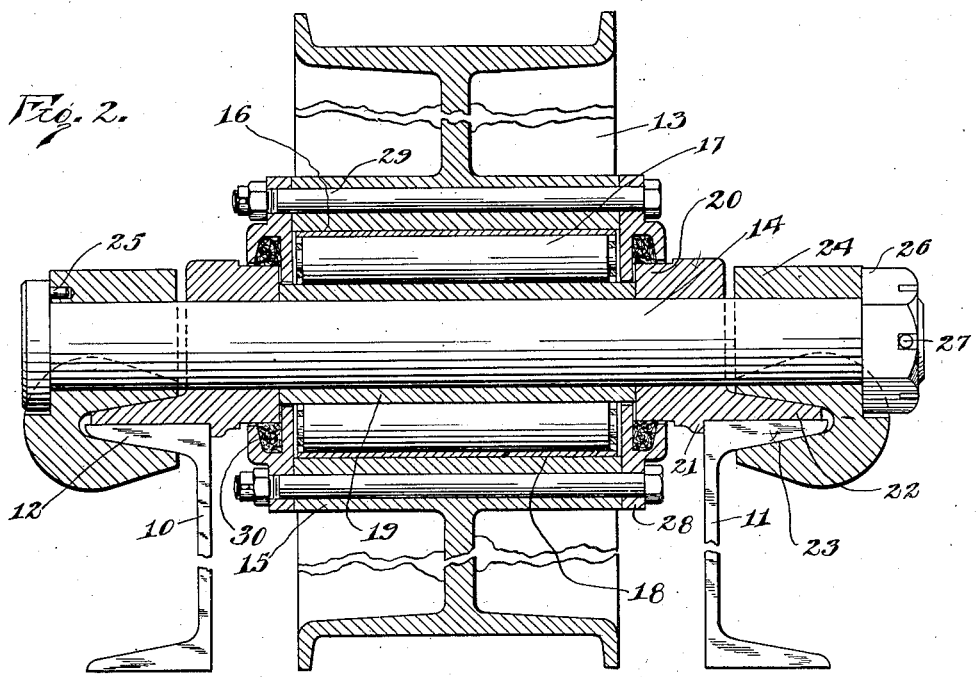
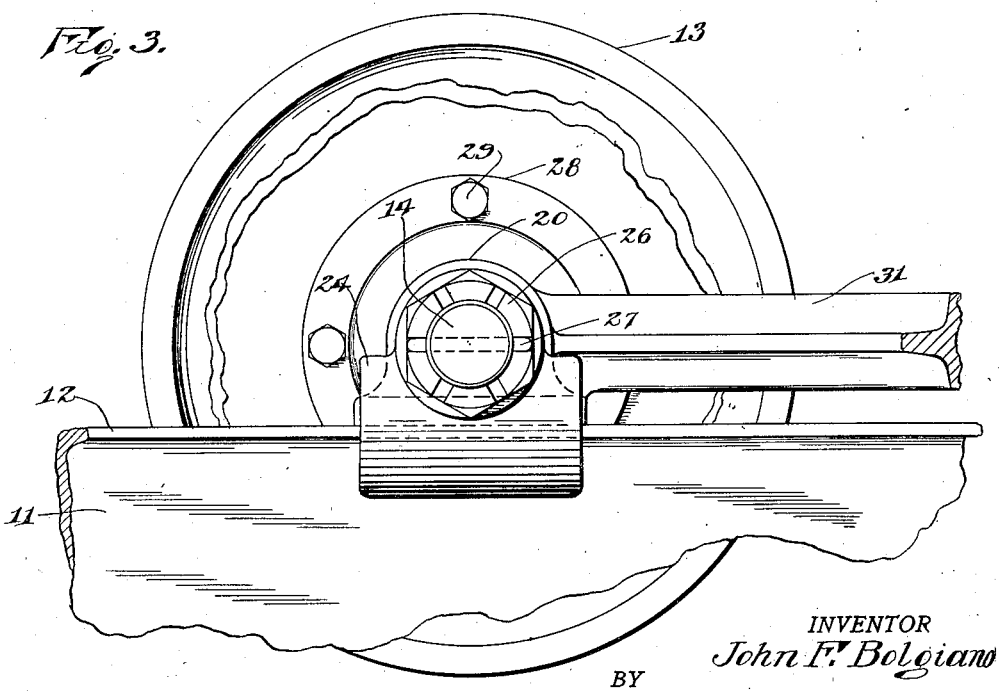
INVENTOR
John F. Bolgiano
BY
Robert H Young  ATTORNEY Patented June 8, 1926.

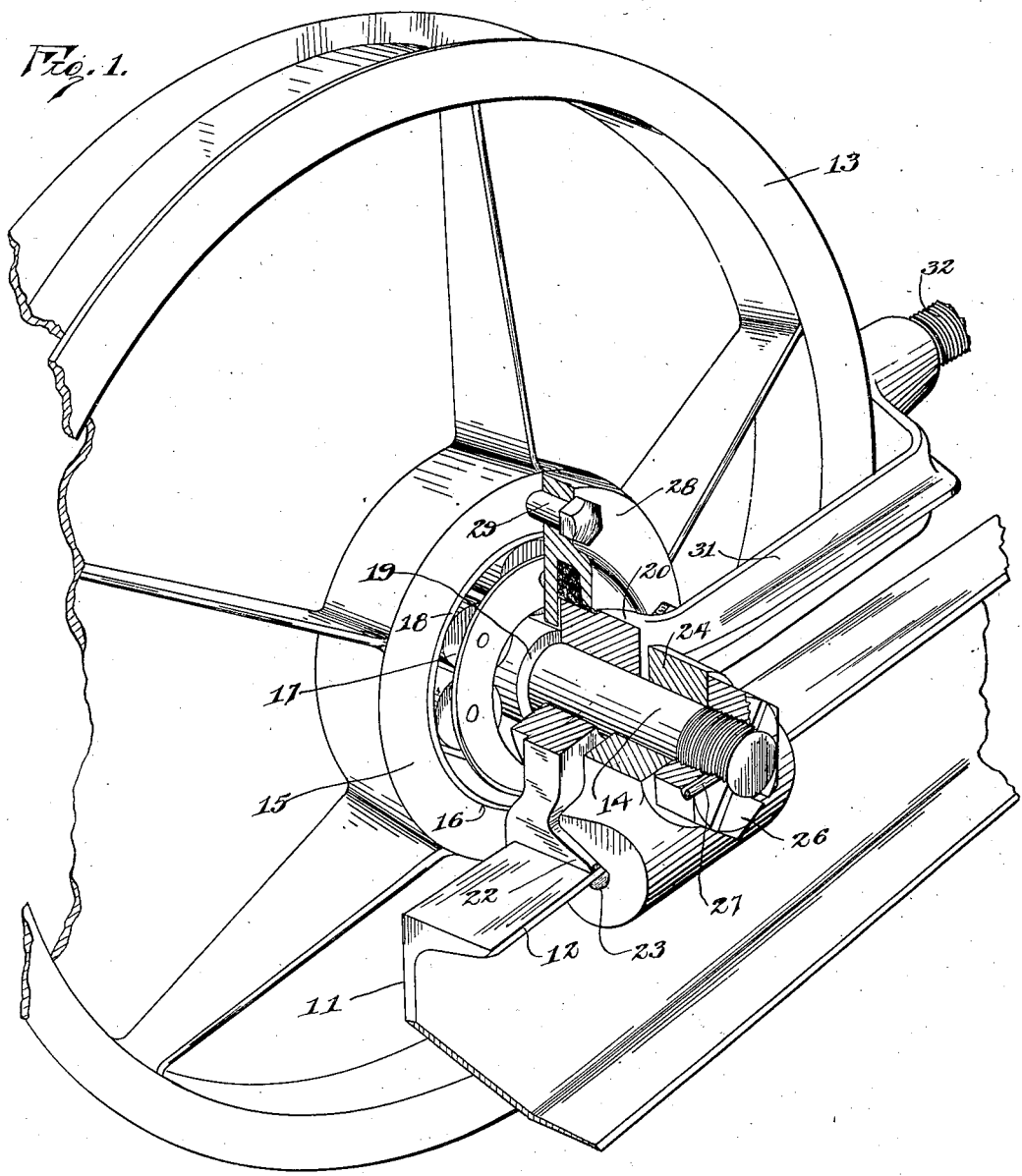

1,588,159

UNITED STATES PATENT OFFICE.

JOHN F. BOLGIANO, OF DAYTON, OHIO.

ADJUSTABLE IDLER STRUCTURE.

Application filed September 21, 1923. Serial No. 664,125.

This invention relates to an adjustable idler structure designed particularly for the front track-carrying idlers of caterpillar tractors and the like, but broadly speaking, capable of use wherever an adjustable mounting for a wheel, pulley, or the like, is desired.

The principal object of the invention is to provide a simple structure to facilitate the adjustment of the front idler in taking up slack in the endless track and also to provide a structure of this kind embodying means for securely fastening the structure in its adjusted position.

The invention embraces other objects, as for example, improvements in structural details, which will be brought out in the course of the following specification.

In the drawing, forming a part hereof,

Fig. 1 is a perspective view of an idler, showing its mounting on the tractor supporting frame, some portions of the structure being broken away to disclose the internal construction.

Fig. 2 is a transverse vertical section through the idler structure and

Fig. 3 is a side view of Fig. 2.

Throughout the views the same reference numerals are applied to the same parts.

The tractor on which the idler structure of the present invention is designed to be used, has supporting frames on opposite sides about which the endless tracks operate. The channel frame members 10 and 11 constitute the side members of one of these frames, and are disposed with the flanges 12 thereof oppositely directed. The tractor wheel 13, suitably channeled to receive the endless track, is mounted between the channels 10 and 11 supported by a bolt 14 resting upon and secured to the channel members. The wheel 13 has in its hub 15 a chamber 16 for the reception of the roller bearing 17, the outer race way for the bearing being provided in the chamber 16 by a bearing ring 18. A spacing sleeve 19 fitting the bolt 14 provides an inner race way for the bearing 17. This sleeve abuts at its opposite ends with bearing blocks 20 resting upon the channels 10 and 11 and having shoulders 21 abutting the inner faces of the channels to guide the idler structure in the adjustment thereof. The blocks 20 have also flanges 22 which over-lie the top flanges 12 of the channels 10 and 11. The upper faces of the flanges 22 are inclined as indicated oppositely to the under faces of the upper flanges 12 of the channels 10 and 11. The flanges 12 and 22 are received in V-notches 23 in clamping blocks 24 on the opposite ends of the bolt 14. The head of the bolt 14 has a dowel pin 25 received in a socket provided therefor in one of the blocks 24 to prevent the turning of the bolt 14 when the nut 26 is tightened in securing the structure in its adjusted position. The spacing sleeve 19, it will be seen, serves in a measure, to prevent the flexure of the channels 10 and 11 inwardly toward each other when the bolt is drawn up, and also maintains the proper relation of the bearing blocks 20 with respect to the hub of the wheel 13, so that no extent of tightening of the bolt can interfere with the free movement of the wheel on its bearing. The nut 26 is suitably castellated to receive a cotter 27 to prevent loosening of the bolt when the structure is once adjusted. The wheel 13 has circular plates 28 secured by bolts 29 in the hub 15 closing the ends of the hub to confine the bearing 17 and retain lubricant in the bearing chamber. These plates serve in addition, to limit the sidewise movement of the wheel by assuming sidewise thrust, by coming into engagement with the bearing blocks 20 when such sidewise thrust occurs. To further retain the lubricant in the bearing chamber, the plates 28 are also provided with felt packing washers 30.

In the operation of adjusting the idler structure, the bolt 14 is loosened to permit adjustment of the idler away from the driving wheel in taking up slack in the endless track. The bearing blocks 20 as shown, will conveniently form a part of a U-shaped yoke 31 having a threaded link 32 to facilitate adjustment of the yoke. After the desired amount of adjustment, the bolt is again drawn up in the course of which the bearing blocks are rigidly secured to the channelled frame members because of the wedging engagement of the flanges 12 and 22 in the V-notches 23.

The invention has been described herein as embodied in a front idler for a caterpillar tractor and as involving certain specific structural details. However, it is to be understood that the invention is capable of other adaptations, and modifications within the terms of the accompanying claims.

I claim:

1. The combination of a pair of spaced flange frame members, a wheel mounted between said frame members to be adjusted longitudinally relative thereto, a bolt for carrying said wheel, bearing blocks at the opposite ends thereof supported on said frame members, a sleeve on said bolt serving to space said bearing blocks, and clamping means on the opposite ends of said bolt forming a wedge with said blocks to secure said bearing blocks on said frame members when said bolt is drawn up.

2. The combination of a frame member having a flange, a wheel mounted thereon, a bolt for carrying said wheel, clamping means on each side of said wheel for engaging said flange as a wedge, a head at one end of said bolt and a nut at the other end for drawing up said bolt to secure both of said clamping means simultaneously to said frame, and a spacing sleeve on said bolt serving as a bearing for said wheel.

3. The combination of a frame member having a flange projecting from the side thereof, a bearing block to lie on said frame member having a flange to overlie the flange of said frame member, a clamping block having a V-notch to receive said flanges, a wheel to be mounted on said frame, and a bolt passing through said wheel, bearing block and clamping block for holding the said parts together clamped to said frame member.

4. The combination of a pair of spaced flanged frame members, a wheel to be mounted thereon, a bolt for carrying said wheel, a bearing block for each end of said bolt on said frame, clamping means at each end of said bolt for wedgingly securing said bearing blocks to the flanges of said frame member as the same are drawn toward each other when said bolt is drawn up, and a spacing sleeve on said bolt providing a bearing for said wheel thereon and engaging said bearing blocks to provide a rigid abutment therefor in the drawing up of said bolt.

5. The combination of a pair of laterally spaced flanged frame members having their flanges outwardly oppositely directed, a wheel to be mounted between said frame members for adjustment longitudinally relative thereto, a bolt for carrying said wheel, means for rigidly maintaining the spaced relation of said frame members, and clamping means at opposite ends of said bolt for wedgingly engaging the flanges of said frame members when said bolt is drawn up to secure said wheel in adjusted position on said frame.

6. The combination of a pair of laterally spaced flanged frame members having their flanges outwardly oppositely directed, a wheel mounted between said frame members to be adjusted longitudinally relative thereto, a bolt for carrying said wheel, bearing blocks near the opposite ends of said bolt to rest on said frame members having flanges overlying the flanges of said frame members and shoulders to abut the inner faces of said frame members, a sleeve on said bolt for spacing said bearing blocks, and clamping means on the opposite ends of said bolt to secure the flanges of said bearing blocks and said frame members together when said bolt is drawn up.

7. The combination of a pair of laterally spaced frame members, a wheel to be mounted therebetween, having a bearing chamber therein extending through the hub thereof from side to side, a shaft extending between said frame members through said chamber, an anti-friction bearing in said chamber acting between said shaft and said wheel, bearing blocks to support the ends of said shaft on said frame members having means to secure the same to said frame members, and circular end plates for the hub of said wheel closing said bearing chamber for the retention of the bearing and lubricant therefor therein and engaging said bearing blocks when a lateral thrust is communicated to said wheel.

8. In an adjustable idler structure or the like, the combination of a pair of spaced supporting frame members, an idler wheel there-between arranged for adjustment longitudinally thereof, a U shaped yoke for adjusting said wheel lengthwise of said frame members having bearing members at the ends of the arms thereof, slidable along said frame members, a bolt for supporting said wheel, a bearing sleeve on said bolt serving to space said bearings and clamping members cooperating with said bearings at opposite ends of said bolt for rigidly fixing the same to said frame members, as the adjustment of said yoke.

9. An adjustable idler structure or the like comprising a shaft bolt for mounting the idler, longitudinal flanged frames, means for securing the idler to said flanges comprising slidable blocks supporting the shaft and provided with inclined projections resting on the flanges, a clamping means enclosing the projections and flanges in wedge like relation, and means for moving said clamping means, said movement actuating the movement of the blocks.

In testimony whereof I affix my signature.

JOHN F. BOLGIANO.